United States Patent
Hong et al.

(10) Patent No.: US 8,208,640 B2
(45) Date of Patent: Jun. 26, 2012

(54) TV AUDIO MULTI-STANDARD DETECTION APPARATUS AND METHOD

(75) Inventors: Shan-Ting Hong, Tai-Chung (TW);
Yi-Chang Tu, Tai-Nan (TW);
Ching-Hsien Liao, Tainan (TW);
Show-Hong Chen, Taipei County (TW);
Ying-Chuan Peng, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1001 days.

(21) Appl. No.: 12/182,129

(22) Filed: Jul. 29, 2008

(65) Prior Publication Data

US 2010/0026907 A1   Feb. 4, 2010

(51) Int. Cl.
*H04H 20/47* (2008.01)
(52) U.S. Cl. .................. 381/2; 381/22; 381/23
(58) Field of Classification Search ............. 381/2, 22, 381/23, 119; 348/462, 465, 558, 604, 738, 348/725; 375/240.25, 271, 326, 332, 354, 375/355, 357; 704/500–504
See application file for complete search history.

(56) References Cited

U.S. PATENT DOCUMENTS

| | | | | |
|---|---|---|---|---|
| 5,784,414 A | * | 7/1998 | Bruekers et al. | 375/324 |
| 2003/0215030 A1 | * | 11/2003 | Hurley | 375/322 |
| 2006/0067442 A1 | * | 3/2006 | Tanaka | 375/347 |
| 2006/0143018 A1 | * | 6/2006 | Densham et al. | 704/500 |
| 2009/0015714 A1 | * | 1/2009 | Hendrix et al. | 348/484 |
| 2009/0115896 A1 | * | 5/2009 | Thaly et al. | 348/484 |

FOREIGN PATENT DOCUMENTS

| | | |
|---|---|---|
| CN | 2888774 Y | 4/2007 |
| TW | 057330 | 3/1984 |
| WO | 2007040769 A2 | 4/2007 |

* cited by examiner

*Primary Examiner* — Cuong Q Nguyen
*Assistant Examiner* — Yosef Gebreyesus
(74) *Attorney, Agent, or Firm* — Thomas, Kayden, Horstemeyer & Risley, LLP (57) ABSTRACT

An audio multi-standard detection apparatus is provided to pre-record a plurality of audio broadcasting format carrier bands. The detection apparatus includes: a carrier calculation unit and a switch controller. The carrier calculation unit is used for receiving an intermediate frequency signal and calculates the first carrier energy of the intermediate frequency signal in each of the frequency bands. From this first carrier energy, the switch controller determines which frequency bands are existed in the intermediate frequency signal, then analyzes the signal via at least one threshold value to determine the frequency band's primary carrier. The switch controller obtains an effective carrier. Further, the switch controller compares the effective carrier with the pre-recorded carrier bands for selectively outputting the appropriate audio broadcasting format. Hence, the present invention achieves the objective of determining the appropriate audio multi-standard and enables the support of broadcast systems in various countries with a single audio decoding chip.

17 Claims, 8 Drawing Sheets

TV AUDIO MULTI-STANDARD DETECTION APPARATUS AND METHOD

BACKGROUND OF THE INVENTION

1. Field of the Invention

The present invention is related to TV audio standards, and more particularly to an audio multi-standard detection apparatus and method applied to analog TV broadcasting.

2. Description of Related Art

Among TV broadcasting signals, the audio signal portion is defined by TV Audio Standard, which includes standards of non-stereo broadcasting, stereo broadcasting, and bilingual broadcasting. Currently, the global TV Audio Standards can primarily be divided into four categories of audio broadcasting format: A2, EIAJ, BTSC, and NICAM, wherein A2 can be further divided into five standards of FM A2 BG, FM A2 DK1, FM A2 DK2, FM A2 DK3, and FM A2 M, while NICAM can be further divided into four standards: AM mono L NICAM, FM mono I NICAM, FM mono BG NICAM, and FM mono DK NICAM. Generally, in different countries or areas the broadcasting systems are different. For example, Japan has adopted the EIAJ broadcasting system as national standard; Taiwan and the United States use BTSC broadcasting system; Europe and China use the NICAM and A2 broadcasting systems, etc.

For currently known TV signal receiving apparatuses, dedicated circuit designs are usually employed for each audio broadcasting signal's format, so as to ensure that the carriers and decoding method will conform to their respective national standard. However, this approach actually limits the products in the sense that they can only function in limited countries or regions; if there is a need for the products in other regions, modifications in design are often necessary in order to match the broadcasting standard of that region. Consequently, not only the chip manufacturers have to design and manufacture different control chips for various TV audio standards, this also causes burden of development and design as well as difficulty of product maintenance on the TV manufacturers' part.

SUMMARY OF THE INVENTION

Therefore, an object of the present invention is, by way of carrier comparison, to compare a calculated carrier with the pre-recorded carrier bands of all audio broadcasting formats and determine the appropriate audio broadcasting format, so that a subsequent circuit can adjust the parameters, to correctly process and play audio signals. Accordingly, the goal of correctly distinguishing signals of various audio broadcasting formats in a single audio decoding chip, so as to adapt to different broadcasting systems, can be achieved; consequently, efficiency and flexibility of the decoding chip can also be increased.

For achieving the object described above, the present invention provides an audio multi-standard detection apparatus which pre-records a plurality of audio broadcasting format carrier bands. In which, the audio multi-standard detection apparatus includes a carrier calculation unit and a switch controller. The carrier calculation unit is used for receiving an intermediate frequency signal and calculating the signal's first carrier energy magnitude in each of the "pre-recorded frequency bands". From these first carrier energy values the switch controller determines which frequency bands actually exist, and then analyzes via at least one threshold value the frequency band in order to determine the frequency band's primary carrier, based on which the switch controller obtains an effective carrier. Further, the switch controller compares the effective carrier with the "pre-recorded frequency bands" to selectively output the appropriate audio broadcasting format.

For achieving the object described above, the present invention further provides an audio multi-standard detection method, in which a plurality of audio broadcasting format carrier bands are pre-recorded, and a received intermediate frequency signal is converted into a baseband signal according to the values of the pre-recorded frequency bands. The method includes the steps of: scanning the carrier of the baseband signal on the recorded frequency bands and respectively calculating each carrier's first carrier energy; finding at least one carrier band from the first carrier energy values, and then analyze via at least one threshold value the frequency band in order to determine the frequency band's primary carrier, and from which obtains an effective carrier; finally, comparing the effective carrier with the "pre-recorded frequency bands" for deciding the appropriate audio broadcasting format, then providing the corresponding audio broadcasting format to the sequential circuits for adjusting parameters, which are used to correctly process and play audio signals. The present invention method thereby makes it possible to support different broadcast systems in various countries with a single audio decoding chip.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
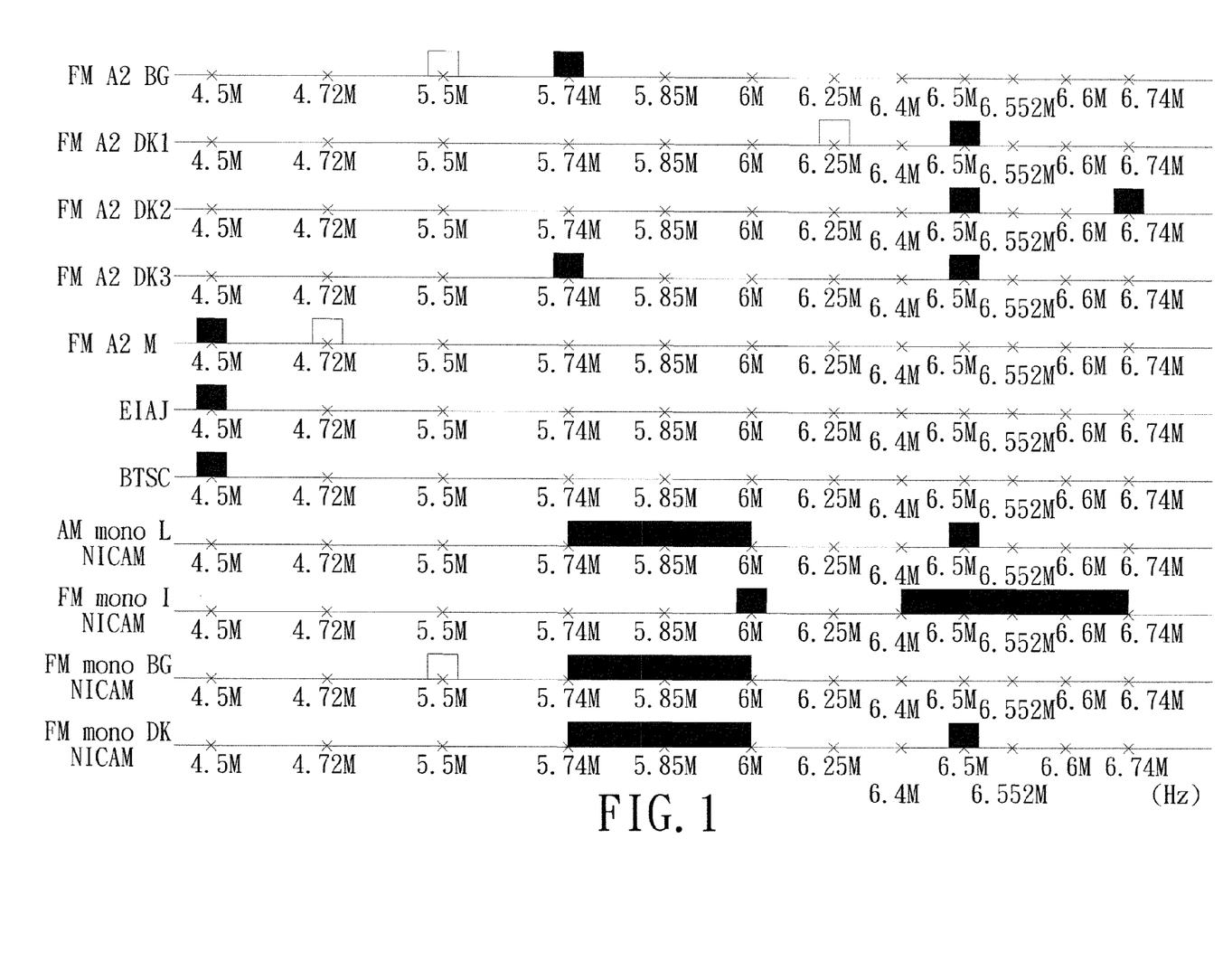
FIG. 1 is a schematic view showing the carrier frequency of audio standards.

In the present invention, the mentioned audio multi-standards include various audio broadcasting formats (eleven types in total) used by broadcasting systems around the world, as shown in FIG. 1, which is a schematic view showing the carriers of audio standards, including FM A2 BG, FM A2 DK1, FM A2 DK2, FM A2 DK3, FM A2 M, EIAJ, BTSC, AM mono L NICAM, FM mono I NICAM, FM mono BG NICAM, and FM mono DK NICAM. Here, it should be noted that the carriers of the above described audio broadcasting formats are formed on one or more of the following twelve frequency bands, including 4.5 MHz, 4.72 MHz, 5.5 MHz, 5.74 MHz, 5.85 MHz, 6 MHz, 6.25 MHz, 6.4 MHz, 6.5 MHz, 6.552 MHz, 6.6 MHz, and 6.74 MHz.

For achieving bilingual or stereo effect, the carrier signal of some audio broadcasting formats will occupy and make use of two frequency bands, as shown in FIG. 1. Here, the filled bar represents the primary carrier and the hollow bar represents the auxiliary carrier, and the present invention achieves its goal of detecting audio broadcasting formats by detecting frequency band of the primary carrier. Besides, among all the audio broadcasting formats, only the NICAM audio broadcasting format contains both an analog and a digital carrier, while the other formats use only analog signals. Analog carriers are characterized by high energy, whereas digital carriers have lower energy but a wider band width.

Therefore, to accurately provide the audio broadcasting format, the detection apparatus of the present invention pre-records the carrier bands of the various audio broadcasting formats described above, and detects the frequency band occupied by the carrier of the received audio signals; then by comparing the detection result and the pre-recorded band information, an audio broadcasting format that matches the received audio signal can be found.

Figure 2:
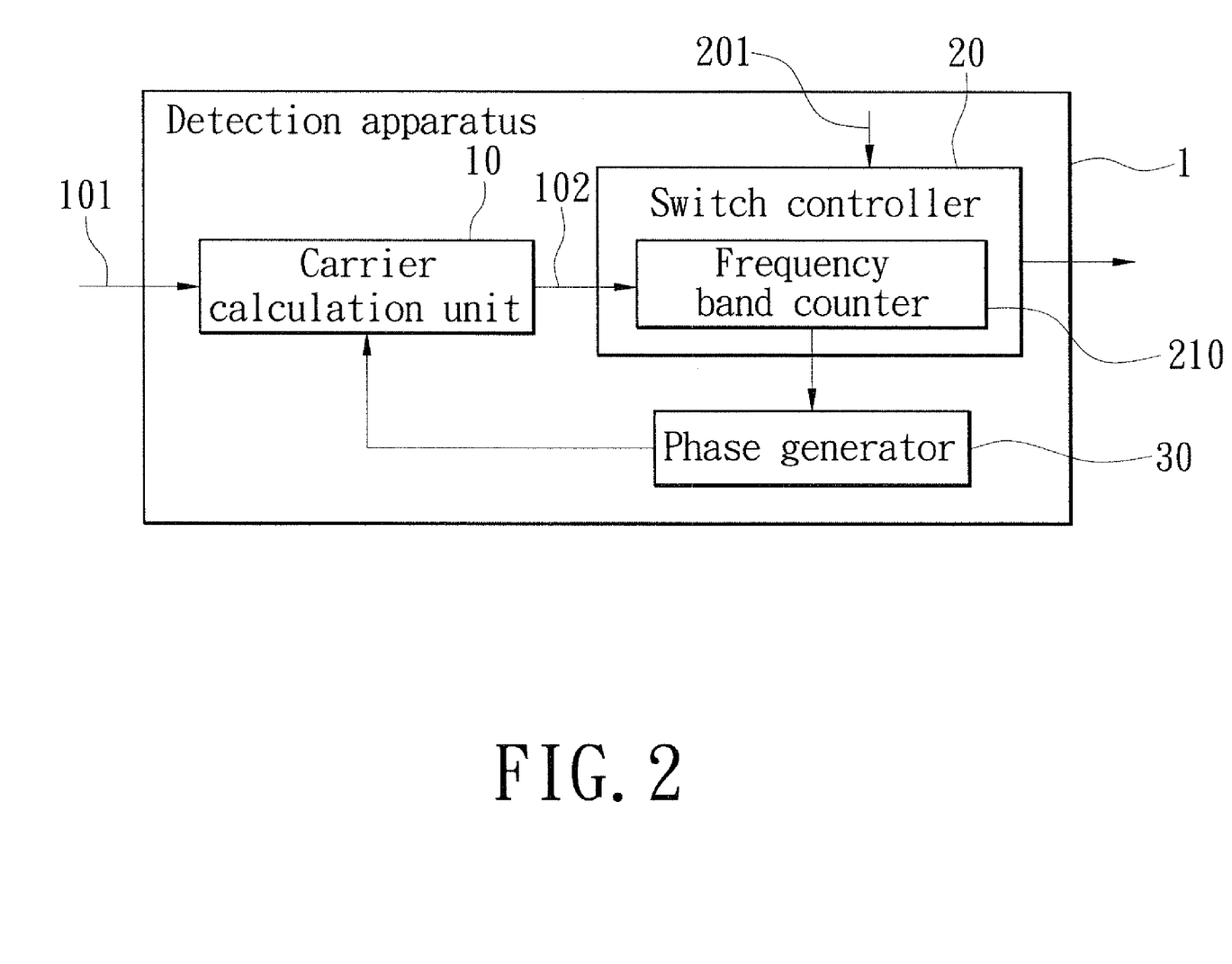
FIG. 2 is a block diagram showing an audio multi-standard detection apparatus in an embodiment according to the present invention.

Please refer to FIG. 2, which is a block diagram showing an audio multi-standard detection apparatus in an embodiment according to the present invention. As shown, the present invention provides an audio multi-standard detection apparatus 1, which includes a carrier calculation unit 10, a switching controller 20, and a phase generator 30. Generally, the audio multi-standard detection apparatus 1 provides the audio detection function in a TV system, and is used for automatically detecting and evaluating the suitable audio standard for the received audio signals. The carrier calculation unit 10 is used for receiving an intermediate frequency signal 101 which is converted and outputted by a tuner (not shown) and an ADC (Analog/Digital Converter) (not shown), wherein the intermediate frequency signal 101 is an SIF signal (sound intermediate frequency signal) after being digitally converted. Then, the carrier calculation unit 10 calculates the energy magnitude of a first carrier 102 of the intermediate frequency signal 101 respectively on the above described twelve frequency bands. Since the phase and angle of frequency signal may vary due to waveform variation, the calculation of the carrier energy in the present invention is based on amplitude; that is, before calculating the first carrier energy 102, the received intermediate frequency signal 101 will be converted into an amplitude orthogonal component for facilitating the carrier energy calculation. Further, the first carrier energy 102 of the present invention is obtained through averaging a predetermined number (e.g., 4096) of samples of carrier energy, so as to generate a first carrier energy 102 which is more representative.

Figure 3:
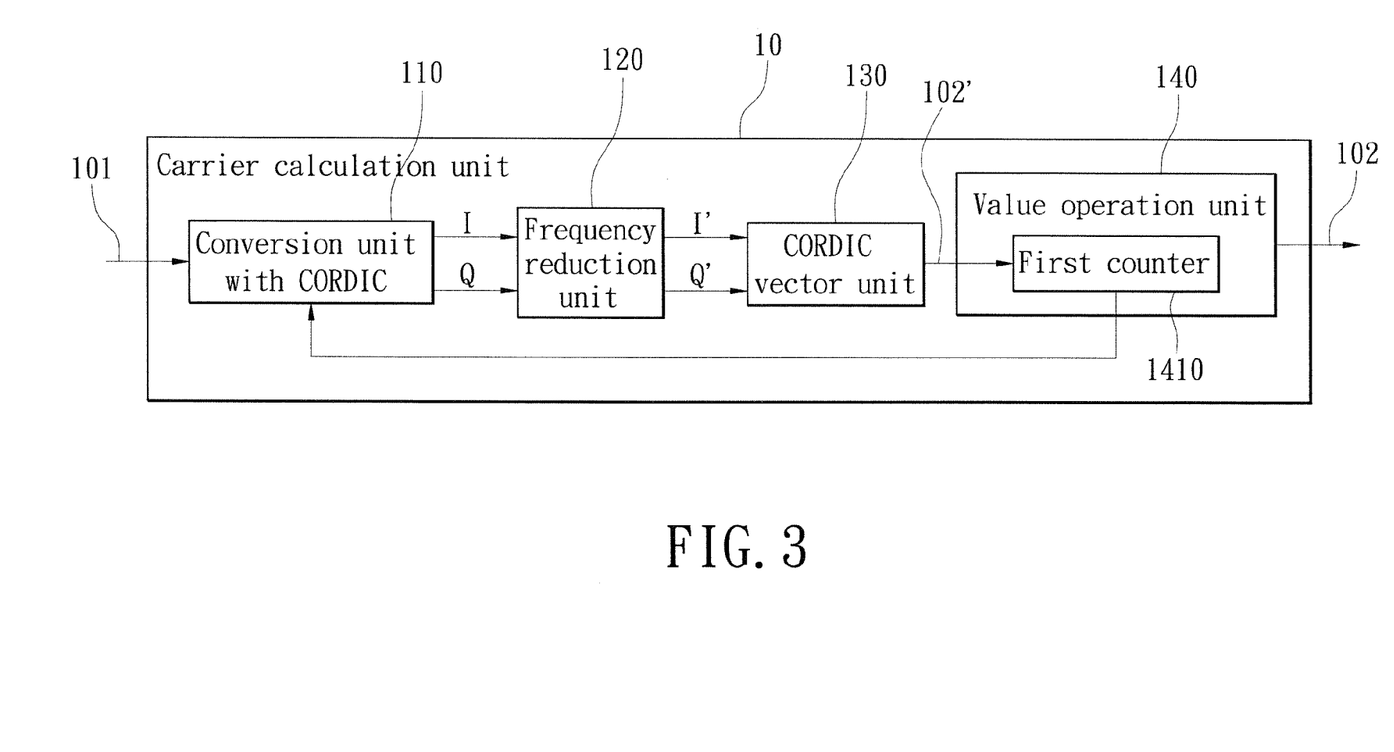
FIG. 3 is a block diagram showing the carrier frequency calculation unit in an embodiment according to the present invention.

For further explanation of the calculation of the first carrier energy 102, please refer to FIG. 3 which shows a block diagram of the carrier calculation unit in an embodiment. As shown, the carrier calculation unit 10 further includes a conversion unit 110 with a Coordinate Rotation Digital Computer (CORDIC), a frequency reduction unit 120, a CORDIC vector unit 130, and a value operation unit 140. The CORDIC conversion unit 110 performs an orthogonal frequency modulation to convert the intermediate frequency signal 101 into a baseband signal, and then further into the amplitude orthogonal component. The amplitude orthogonal component includes a baseband component I and component Q. In order to equip the detection apparatus 1 (FIG. 1) with higher power/calculation efficiency, the amplitude orthogonal components I and Q are limited to a certain bandwidth by the frequency reduction unit 120, so as to produce the amplitude orthogonal components (I' and Q') based on a sampling rate. For example, the sampling rate of 24.576 MHz outputted of the ADC is reduced to the sampling rate of 384 kHz of the amplitude orthogonal components (I' and Q') through the frequency reduction unit 120.

Next, the CORDIC vector unit 130 converts the amplitude orthogonal components (I' and Q') into a second carrier energy 102' according to the polar coordinate values of each component. The second carrier energy 102' is then accumulated to collect a predetermined number of samples (e.g., 4096 samples) via a first counter 1410 in the value operation unit 140, and the value operation unit 140 then carries out an averaging operation and outputs the first carrier energy 102 of the currently scanned frequency band.

The phase generator 30 in FIG. 2 is used to define the fixed frequencies of the above described twelve frequency bands and to provide frequency band shift to the carrier calculation unit 10, so as to subsequently complete the calculation of the first carrier energy 102 for each pre-recorded band. A frequency band counter 210 in the switching controller 20 is used to count the frequency band shift provided by the carrier calculation unit 10 via the phase generator 30, so as to make sure that the first carrier energy 102 has been produced on each of the frequency bands. Then, the switching controller 20 gathers the statistic information of the first carrier energy 102 on each of the frequency bands to determine which frequency band(s) has been occupied by carrier. As described above, each audio broadcasting signal format has at least one primary carrier, and in the present invention, the detection apparatus 1 is primarily used to detect the audio standard essentially by determining the frequency band where the primary carrier exists. Therefore, it is according to a threshold value 201 that the mentioned switch controller 20 further analyzes whether the primary carrier existing in the detected frequency band is an effective carrier.

Since the primary carriers included in different audio broadcasting format's signals may be analog and/or digital carriers, for different types of primary carriers, the switch controller 20 needs to utilize different methods to analyze the frequency band occupied by the primary carrier. For example, a hysteresis analyzing scheme is operated to analyze the frequency band occupied by analog primary carrier, and further a floating analyzing scheme is used to analyze the frequency band occupied by digital primary carrier. In particular, two thresholds are provided for the hysteresis scheme to repeatedly screen the analog primary carrier. If the analog primary carrier is less than a first threshold, it is regarded as an ineffective carrier, or only if the analog primary carrier is larger than a second threshold, it can be regarded as an effective carrier. Here, the ineffective carrier might be the noise or a surge caused by interference, but not the carrier signal of the audio broadcasting format's signal. Thus only the effective carrier is classified as the audio broadcasting format's carrier signal through those thresholds.

Figure 4:
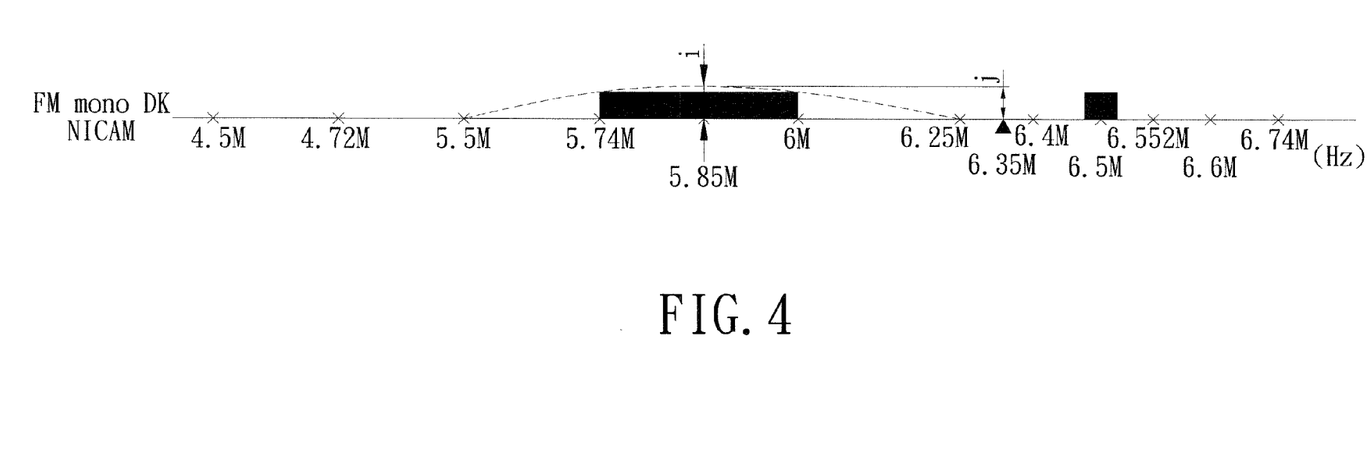
FIG. 4 is a schematic view showing the spectrum of NICAM audio broadcasting format according to the present invention.

Please refer to FIG. 4, in order to illustrate the floating scheme, which is a schematic view showing the spectrum of NICAM audio broadcasting signal's format. The NICAM signal format includes digital and analog primary carriers. As shown, the frequency band of the digital primary carrier is located at and around 5.85 MHz, and with a wider bandwidth (approximately arranging from 5.74 MHz to 6 MHz). However, in practice the frequency curve obtained by a spectrum analyzer is shown as the dotted line in FIG. 4. If the difference "i" between the highest and the lowest level of the carrier at 5.85 MHz is directly used as the threshold 201 for further analysis, a waveform distortion might occur since the digital carriers are easily interfered by noise, so that the thresholds 201 might not be calculated accurately. Therefore, according to the floating scheme, a floating frequency band (such as 6.35 MHz), where it can be insured that the NICAM carrier does not reside, is selected as a basis. Then the difference "i" between the level at the floating frequency band and the level at the frequency band 5.85 MHz where the digital primary carrier is located, is set as the threshold value 201, so as to complete the detection of the frequency band occupied by the digital primary carrier. In other words, in this floating scheme, the floating noise floor is used as the threshold.

Therefore, the switch controller 20 can obtain the analyzed frequency band occupied by the effective carrier that is mentioned above. Next, the audio broadcasting format that matches the received audio signal is determined by comparing the analyzed frequency bands with the pre-recorded audio broadcasting format.

Figure 5:
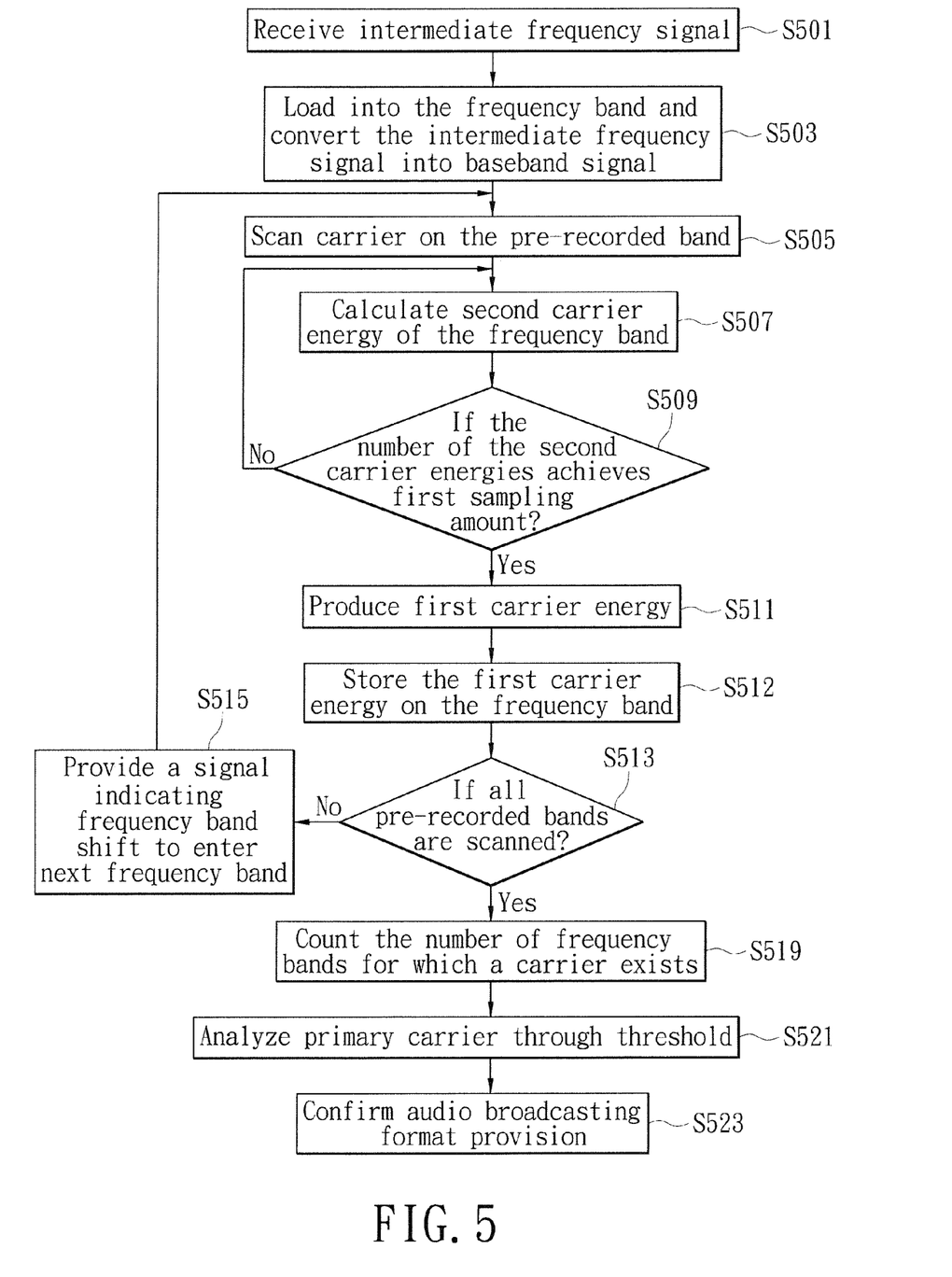
FIG. 5 is a flow chart showing the audio multi-standard detection method according to the present invention.

Reference is made to FIG. 5, for further explanation, which shows a flow chart of the audio multi-standard detection method. The current embodiment provides the method implemented by the audio multi-standard detection apparatus 1. Similarly, the detection apparatus 1 as shown in FIG. 2 pre-records the frequency bands occupied by carriers of all audio broadcasting format's signals. The detection method includes the steps of: providing the carrier calculation unit 10 to receive the intermediate frequency signal 101 (S501), sequentially loading the twelve frequency bands as described in FIG. 1 through the frequency band shift of the phase generator 30, and then converting the intermediate frequency signal 101 into a baseband frequency signal according to the frequency band currently to be scanned (S503). Then the method goes to scan the carriers on the current frequency band via the conversion unit with CORDIC 110 located in the carrier calculation unit 10 (S505), and to calculate the second carrier energy 102' on the current frequency band via the CORDIC vector unit 130 (S507).

To increase the representativeness of the carrier energy calculation, in the design of this embodiment 4096 samples of the second carrier energy 102' are chosen for performing an average operation. The first counter 1410 is used to keep track and determine if the first sample number (4096 samples) of samples of the second carrier energy 102' has been reached (S509). If the result is negative, the step of the carrier scanning on the current frequency band will be repeated; if the result is positive, the accumulated number of the second carrier energy 102' has reached 4096, and the value operation unit 140 performs the average operation to generate the first carrier energy 102 (S511). Further, a first register (not shown) can be used to store the calculated first carrier energy 102 on the current frequency band (S512). For the skilled person in the art, the average operation described in this embodiment is only for illustrative purpose and the number of samples does not need to be limited to 4096; other averaging strategies or weighted averaging strategy strategies may also be used. Even if the averaging operation is omitted, the second carrier energy value can still be used as the reference for determining the primary carrier.

After step (S512), the frequency band counter 210 determines if all the pre-recorded bands have been scanned (step S513), in order to confirm that the first carrier energy 102 has been calculated on every frequency band. If the result of step (S513) is negative, it indicates that not all the pre-recorded bands have been scanned, and the phase generator 30 will provide a signal instructing frequency band shift to enter the scan for the next pre-recorded band (S515). After that, the steps after (S503) are repeated until twelve pre-recorded bands are completely scanned.

If the result of step (S513) is positive, it indicates that all the pre-recorded bands are completely scanned, and then the switch controller 20 will perform statistics and determine the number of the frequency bands where the carrier actually exists according to the value of first carrier energy 102 that is stored in the first register (S519). In the present invention, the primary carrier detection is carried out based on the frequency bands where the carrier actually exists, but since these detected primary carriers may be the actual audio signal or merely be waveforms produced from noise, the threshold 201 is further applied to analyze the primary carrier (S521). As a result, the frequency band where the effective carrier is located can be obtained. Then, the obtained frequency band is compared with the pre-recorded bands, for deciding the audio broadcasting format that matches the received audio signal (S523). The so determined audio broadcasting format is then provided for subsequent circuitry to adjust the parameters, for correctly processing and playing the audio signal.

Moreover, if after the frequency band where the effective carrier is located is compared with the carrier frequency of the pre-recorded audio broadcasting format's signal, it is determined that the matched audio broadcasting formats are more than one, the preferred audio broadcasting format is provided according to a certain priority, and the other matching formats are also provided as alternative option. Said priority is decided by predetermining an order for the different audio broadcasting formats and such order is stored in a second register (not shown). With this arrangement, when more than one matched broadcasting audio format is found, the pre-set order stored in the second register will be referred to as a basis for determining priority.

Figure 6A:
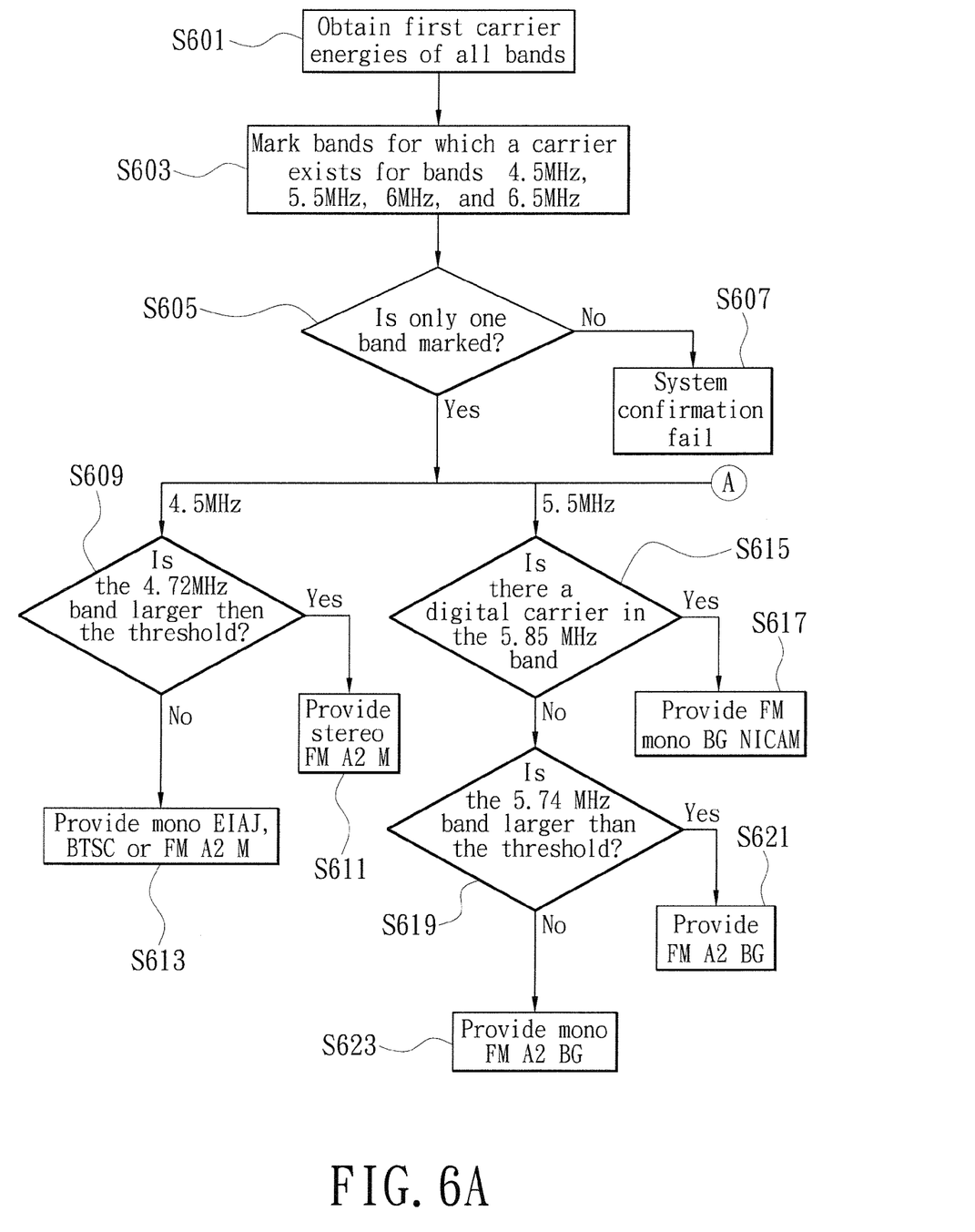
FIGS. 6A~6B are flow charts showing the procedure for deciding the audio broadcasting format in an embodiment according to the present invention.

Please refer to FIGS. 6A.about.6B, which are the flow charts showing the procedure for deciding the audio broadcasting format in an embodiment according to the present invention, and the description of this embodiment corresponds to further details of step (S519) to step (S523) in FIG. 5. It should be noted that this embodiment divides the eleven audio broadcasting formats described in FIG. 1 into a plurality of systems according to the frequency bands occupied by their carriers; for example, they are divided into the following four systems: M/N system (EIAJ, BTSC, FM A2 M), BG system (FM A2 BG, FM mono BG NICAM), I system (FM_mono I NICAM, AM_mono I NICAM), and L/DK system (FM A2 DKI, FM A2 DK2, FM A2 DK3, FM mono DK NICAM, AM_mono L NICAM). The frequency bands used for distinguishing these systems are respectively set to 4.5 MHz, 5.5 MHz, 6 MHz and 6.5 MHz.

Figure 6B:
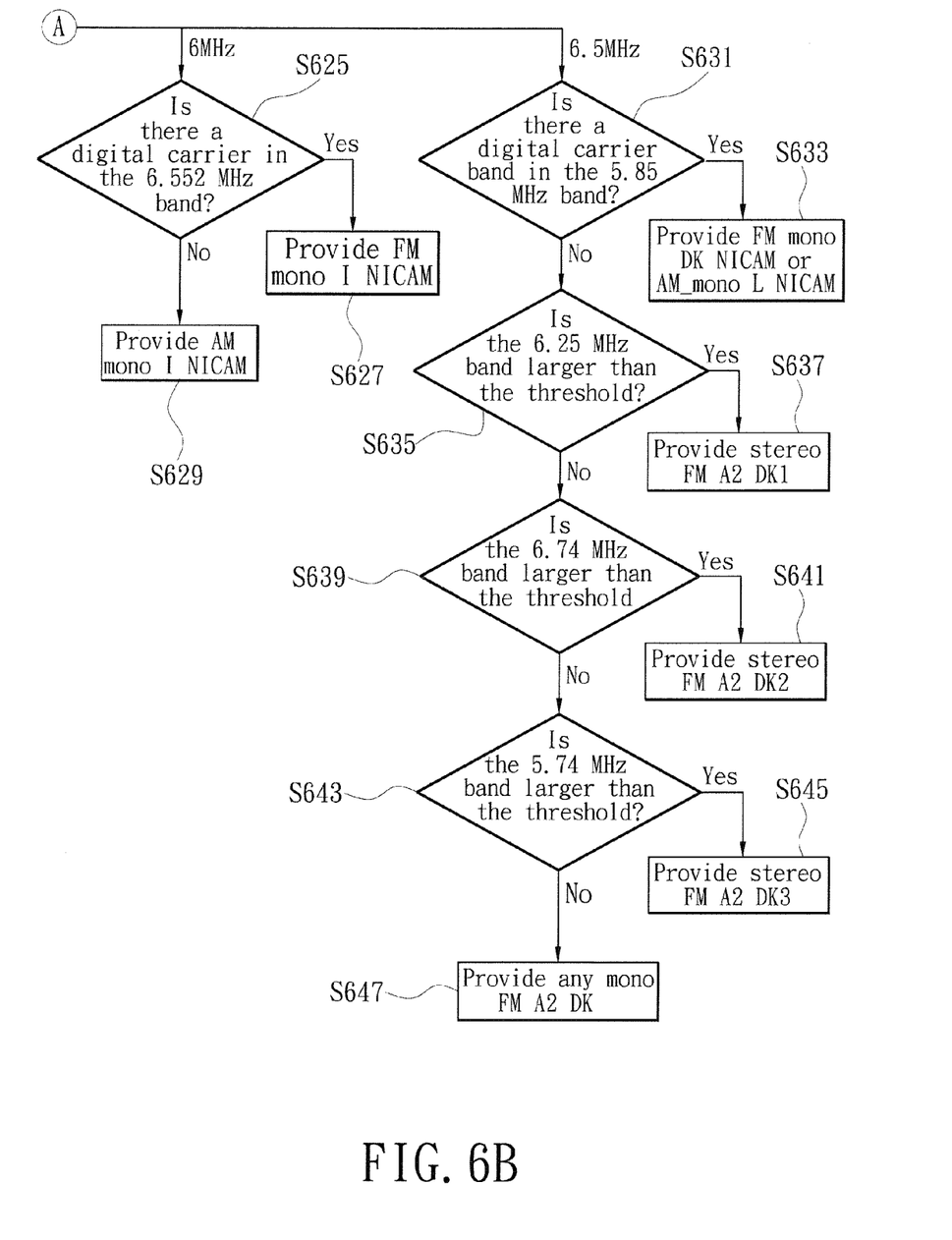

Therefore, after obtaining the first carrier energy for all pre-recorded bands (s601), the frequency bands 4.5 MHz, 5.5 MHz, 6 MHz, and 6.5 MHz where a carrier actually exists are marked (S603). In step (S605), it is determined whether only one frequency band is marked among frequency bands 4.5 MHz, 5.5 MHz, 6 MHz, and 6.5 MHz. If the result of step (S605) is negative, it indicates that there is no system to be confirmed (S607). This may be caused by the detection of multiple frequency bands with carriers so that multiple frequency bands are marked and the system cannot be confirmed, or by the fact that no frequency band with a carrier has been detected so that no frequency band is marked.

If the result of step (S605) is positive, it indicates that only one of the frequency bands with carrier is marked, and the subsequent steps are carried out based on the marked frequency band. If the 4.5 MHz frequency band is marked, then the signal belongs to the M/N system, and the hysteresis scheme is used to determine whether the 4.72 MHz frequency band is larger then the preset threshold (S609). If the result is positive, then both frequency bands 4.5 MHz and 4.72 MHz will have effective carriers, and after comparing with the pre-recorded bands the stereo audio broadcasting format FM A2 M will be selected and provided (S611). In the above case the format will be stereo because two frequency bands have effective carriers.

In contrast, if the result of step (S609) is negative, it indicates that only the 4.5 MHz frequency band has effective carriers, and after comparing with the pre-recorded bands the mono audio broadcasting format EIAJ, BTSC, or FM A2 M will be selected and provided (S613). Here, the audio broadcasting format is provided according to the priority and the other formats are also provided as alternative for enabling switching among formats.

Figure 7A:
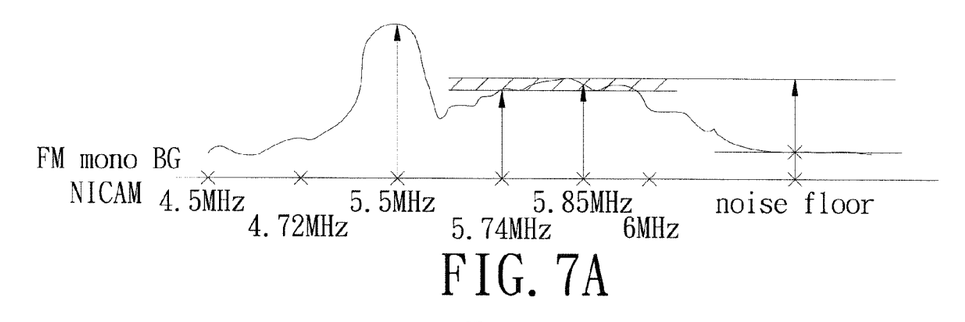
FIG. 7A is a schematic view of the audio broadcasting format FM mono BG NICAM.

After the result of step (S605) is determined to be positive, the BG system is selected if the 5.5 MHz frequency band is marked. After being selected as BG system, as shown in FIG. 7A, a floating scheme and threshold value are used to determine if there exists any digital carrier at the 5.85 MHz frequency band (S615). If the result is positive, both the frequency bands 5.5 MHz and 5.85 MHz are determined to have effective carriers, and the frequency band 5.85 MHz has a digital carrier. Therefore, after comparing with the pre-recorded bands the audio broadcasting format FM mono BG NICAM will be selected and provided (S617).

Figure 7B:
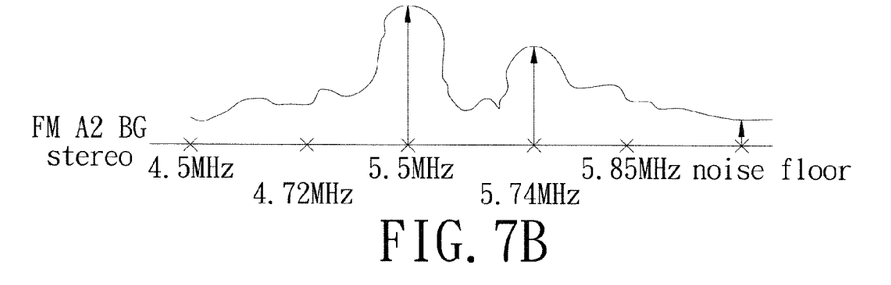
FIG. 7B is a schematic view of the audio broadcasting format FM A2 BG stereo.
Figure 7C:
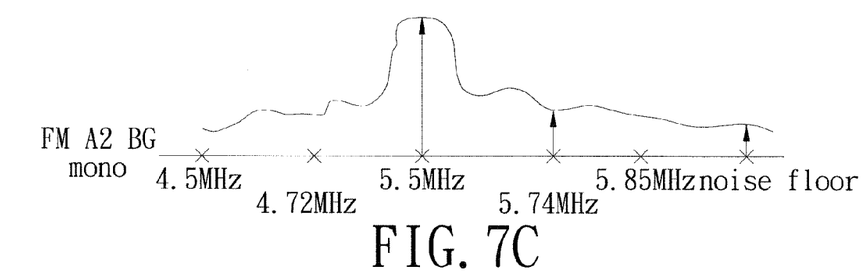
FIG. 7C is a schematic view of the audio broadcasting format FM A2 BG mono.

If the result of step (S615) is negative, as shown in FIGS. 7B and 7C, a hysteresis scheme is used to determine whether the 5.74 MHz frequency band is larger than the preset threshold (S619). If the result of step (S619) is positive, both the frequency bands 5.5 MHz and 5.74 MHz are determined to have effective carriers, and thus after comparing with the pre-recorded bands the stereo audio broadcasting format FM A2 BG will be selected and provided (S621). If the result of step (S619) is negative, then the carrier on the 5.74 MHz frequency band is determined as noise, and only the 5.5 MHz frequency band has an effective carrier. Therefore, after comparing with the pre-recorded bands the mono audio broadcasting format FM A2 BG is provided (S623).

After the step (S605) provides a positive result, the I system is selected if the 6 MHz frequency band is marked. After that, the floating scheme and the threshold value are used to determine whether there exists any digital carrier at the 6.552 MHz frequency band (S625). If the result is positive, both the frequency bands 6 MHz and 6.552 MHz will have effective carriers, and the frequency band 6.552 MHz has a digital carrier. Therefore, after comparing with the pre-recorded bands the audio broadcasting format FM mono I NICAM will be selected and provided (S627). If the result of step (S625) is negative, it indicates that only the 6 MHz frequency band has effective carriers, and thus after comparing with the pre-recorded bands the audio broadcasting format AM mono I NICAM will be provided (S629).

After the step (S605) provides a positive result, L/DK system is selected if the 6.5 MHz frequency band is marked, and the floating scheme and the threshold value are used to determine whether there exists any digital carrier at the 5.85 MHz frequency band (S631). If the result of step (S631) is positive, both the frequency bands 6.5 MHz and 5.85 MHz will have effective carriers, and the frequency band 5.85 MHz has a digital carrier. Therefore, after comparing with the pre-recorded bands the audio broadcasting format FM mono DK NICAM or AM_mono L NICAM will be selected and provided (S633). The audio broadcasting format is provided according to the priority and the other format is also provided as alternative for enabling switching between formats.

If the result of step (S631) is negative, the hysteresis scheme is used to determine if the 6.25 MHz frequency band is larger than the preset threshold (S635). If the result of step (S635) is positive, then both frequency bands 6.5 MHz and 6.25 MHz will have effective carriers, and thus after comparing with the pre-recorded bands the stereo audio broadcasting format FM A2 DK1 will be selected and provided (S637).

If the result of step (S635) is negative, a hysteresis scheme is used to determine whether the 6.74 MHz frequency band is larger than the preset threshold (S639). If the result of step (S637) is positive, both the frequency bands 6.5 MHz and 6.74 MHz will have effective carriers, and thus after comparing with the pre-recorded bands the stereo audio broadcasting format FM A2 DK2 will be selected and provided (S641).

If the result of step (S639) is negative, the hysteresis scheme is used to determine whether the 5.74 MHz frequency band is larger than the preset threshold (S643). If the result of step (S643) is positive, both the frequency bands 6.5 MHz and 5.74 MHz will have effective carriers, and thus after comparing with the pre-recorded bands the stereo audio broadcasting format FM A2 DK3 will be selected and provided (S645). Finally, if the result of step (S643) is negative, it indicates that only the frequency band 6.5 MHz has an effective carrier, and no digital carrier exists. Therefore, after comparing with the pre-recorded bands any mono audio broadcasting format FM A2 DK can be selected and provided (S647).

It is to be noted that the thresholds described above are adjustable and can have different value in response to varied frequency band analysis schemes. The setting may vary according to different designs and is not meant for limiting the scope of the present invention.

In the aforesaid, the present invention gathers statistics of the carrier energy of the digital SIF signal in order to calculate the first carrier energy and to compare that value with each of the pre-recorded bands to obtain the effective carriers, which are used for audio broadcasting format matching. This method not only provides more precise determination of the audio broadcasting format matching to different digital SIF signals for facilitating the parameter adjustment of the sequential circuit, but also achieves the goal of utilizing only a single audio decoding chip to support the broadcasting systems all over the world. The significantly increased chip application range enables faster global product launch time by reducing the need for localized assembly changes, and thus prevents wasting of resources. It also enables the product to be shipped from an over-supplied location to an under-supplied location with no need to worry about audio decoding chip re-assembly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention, which are expressed by the terms of the appended claims.

What is claimed is:

1. An audio multi-standard detection apparatus, having a plurality of pre-recorded audio broadcasting format carrier bands, comprising:

a carrier calculation unit, for receiving an intermediate frequency signal and calculating a first carrier energy of the intermediate frequency signal in each of the pre-recorded carrier bands; and a switch controller, for gathering statistic information of the first carrier energy in each of the pre-recorded carrier bands in order to obtain at least one frequency band where a carrier exists, and for analyzing the at least one obtained frequency band with respect to at least one threshold value to determine at least one effective carrier, from which an audio broadcasting format is confirmed, wherein the audio broadcasting format confirmed by the switch controller comprises the at least one corresponding effective carrier;

wherein the at least one effective carrier comprises at least one primary carrier, the primary carrier being analyzed using a hysteresis scheme to analyze an analog primary carrier and using a floating scheme to analyze a digital primary carrier.

2. The audio multi-standard detection apparatus as claimed in claim 1, wherein the intermediate frequency signal is a digital sound intermediate frequency (SIF) signal.

3. The audio multi-standard detection apparatus as claimed in claim 1, wherein the first carrier energy is calculated from at least one amplitude orthogonal component, and the carrier calculation unit further comprises:
- a conversion unit with coordinate rotation digital computer (CORDIC), for converting the intermediate frequency signal into a baseband signal and from the baseband signal into the at least one amplitude orthogonal component;
- a frequency reduction unit, for limiting the at least one amplitude orthogonal component to a certain bandwidth, so as to obtain the at least one amplitude orthogonal component based on a sampling rate;
- a CORDIC vector unit, for converting each of the at least one amplitude orthogonal component into a second carrier energy; and
- a value operation unit, for accumulating a predetermined number of samples of the second carrier energy and for obtaining an average of the second carrier energies, and for outputting the average as the first carrier energy.

4. The audio multi-standard detection apparatus as claimed in claim 3, wherein the at least one amplitude orthogonal component comprises a baseband component I and a baseband component Q.

5. The audio multi-standard detection apparatus as claimed in claim 3, wherein the value operation unit further comprises a first counter for counting the predetermined number of the accumulated samples of second carrier energies in order to determine when the predetermined number of samples has been reached.

6. The audio multi-standard detection apparatus as claimed in claim 1, wherein the hysteresis scheme utilizes two threshold values to analyze the analog primary carrier.

7. The audio multi-standard detection apparatus as claimed in claim 1, wherein the floating scheme utilizes an operation with a floating frequency band to produce the threshold, so as to analyze the digital primary carrier.

8. The audio multi-standard detection apparatus as claimed in claim 1, further comprising a phase generator for defining a fixed frequency of each of the pre-recorded carrier bands and for providing a signal that indicates frequency band shift to the carrier calculation unit.

9. The audio multi-standard detection apparatus as claimed in claim 8, wherein the switch controller further comprises a frequency band counter for counting whether the carrier calculation unit produces the first carrier energy on each of the pre-recorded carrier bands according to the signal from the phase generator that indicates frequency band shift.

10. An audio multi-standard detection method, wherein a plurality of audio broadcasting format carrier bands are pre-recorded, an intermediate frequency signal is received, and the intermediate frequency signal is converted into a baseband signal, the method comprising the steps of:
- scanning carriers of the baseband signal on each of the pre-recorded carrier bands and respectively calculating a first carrier energy of each of pre-recorded carrier bands;
- finding at least one frequency band where a carrier exists according to the first carrier energy of each of the pre-recorded carrier bands;
- analyzing the frequency band where a carrier exists with respect to at least one threshold for obtaining at least one effective carrier; and
- comparing the at least one effective carrier with the pre-recorded carrier bands to selectively output signals in one of the audio broadcasting formats, wherein the selectively outputted audio broadcasting format comprises the at least one corresponding effective carrier;

wherein the at least one effective carrier comprises at least one primary carrier, the primary carrier being analyzed using a hysteresis scheme to analyze an analog primary carrier and using a floating scheme to analyze a digital primary carrier.

11. The audio multi-standard detection method as claimed in claim 10, wherein the first carrier energy is calculated from at least one amplitude orthogonal component and the carrier of the baseband signal is converted into the at least one amplitude orthogonal component.

12. The audio multi-standard detection method as claimed in claim 11, wherein the at least one amplitude orthogonal component comprises a baseband component I and a baseband component Q.

13. The audio multi-standard detection method as claimed in claim 10, wherein the hysteresis scheme utilizes two thresholds to analyze the analog primary carrier.

14. The audio multi-standard detection method as claimed in claim 10, wherein the floating scheme uses an operation with a floating frequency band to produce the threshold, so as to analyze the digital primary carrier.

15. The audio multi-standard detection method as claimed in claim 10, wherein one audio broadcasting format is selected from a list of matching formats if there are multiple audio broadcasting formats obtained after the pre-recorded carrier bands have been compared with the at least one effective carrier.

16. The audio multi-standard detection method as claimed in claim 10, wherein a first counter is provided for counting and tracking the accumulated number of second carrier energies sampled at each of the pre-recorded carrier bands, wherein an averaging operation is performed when the accumulated number equals a predetermined number of samples, and the result of the averaging is the first carrier energy.

17. The audio multi-standard detection method as claimed in claim 10, wherein a frequency band counter is further provided for counting frequency band shift so as to determine whether each of the pre-recorded carrier bands respectively has a first carrier energy, and if the result is positive then store values of each first carrier energy for finding the at least one effective carrier.

* * * * *